Figure 1:
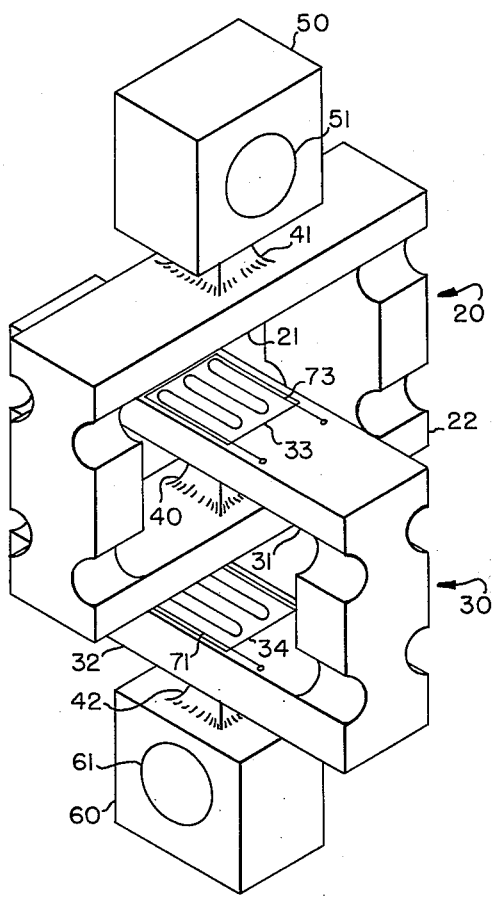

Nov. 12, 1963   A. E. SEED   3,110,175
LOAD CELL
Filed June 28, 1959   2 Sheets-Sheet 2
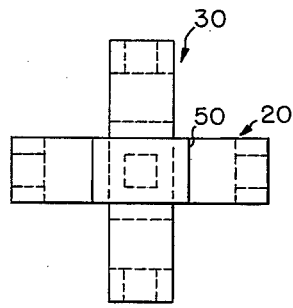
_Fig. II_
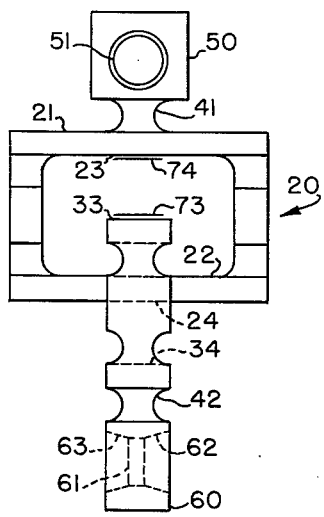
_Fig. III_
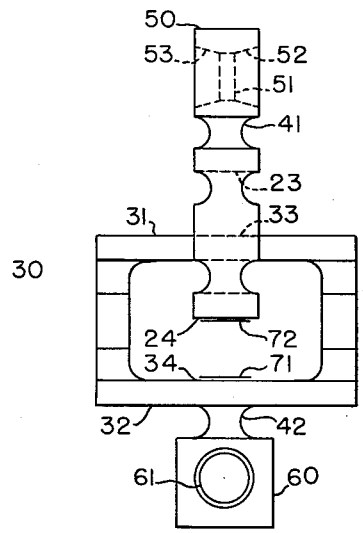
_Fig. IV_
*INVENTOR.*
ANIESE E. SEED
BY
Marshall, Marshall & Yeasting
ATTORNEYS

3,110,175
LOAD CELL
Aniese E. Seed, Toledo, Ohio, assignor to Toledo Scale Corporation, Toledo, Ohio, a corporation of Ohio
Filed July 28, 1959, Ser. No. 830,097
6 Claims. (Cl. 73—141)

This invention relates generally to load weighing devices and in particular to load cells of the type which are utilized in conjunction with various strain gage devices to determine the magnitude of a load applied to a load cell.

Load cells are utilized in many different fields where load forces are to be measured or masses are to be weighed. Load cells in conjunction with strain gage devices find particular application in permanent installations in which the load cells are so located that it is impossible or very difficult to provide maintenance for the load weighing devices. In most applications it is impossible to center a load directly over one load cell so that a plurality of the load cells must be used to support and measure a particular load. An outstanding example of this is a load weighing device for trucks. If it is impossible to center the load over one load cell then the off-center loading or torque loading of a load cell and how it reacts thereto is very important.

In still other applications load cells are used to measure loads which transmit rotational torque to the load cell. For example, the screwdown screw of a rolling mill applies a rotational torque to the measuring load cell, creating torque strains within the cell in the load sensitive area.

The physical size of a load cell is important in that a standard line of load cells of a particular geometry may perform well at one size while another size responds inefficiently to an applied load.

Accordingly, it is an object of this invention to provide an improved load cell which is efficient at all sizes, the cost of which is small, which effectively resists undesired rotational torque forces, and which balances off-center loading.

It is a further object of this invention to provide a load cell device which may be formed from one piece of stock thereby providing low mechanical hysteresis, has mounting surfaces for strain gage devices on which the stress is uniform and mounting surfaces from which both positive and negative stresses may be obtained.

In accordance with the above objects it is a feature of this invention to provide a force measuring device comprising a pair of frames, each of the frames having a plurality of sides. Means are provided coupling one side of one frame to one side of the other frame. Each of the coupled sides have mounting surfaces for load responsive devices such as strain gages. If the frames are interlinked mounting surfaces on the coupled sides are under compression when a compressive force is applied to the frames. If the frames are not interlinked mounting surfaces on the coupled sides are under tension when a compressive force is applied to the frames. The coupling means is advantageously a filleted coupling member which is operable to make the mounting surfaces on the coupled sides more sensitive to stress and thus producing more measurable tension and compression for strain gages mounted thereon. The force measuring device may be an integral device formed from one piece of stock thereby reducing undesirable mechanical hysteresis effects.

It is desirable for each of the frames to have two parallel sides. If two of the sides of each frame are parallel the number of mounting surfaces for strain gage devices is doubled. Further, the mounting surfaces on the parallel sides which are not coupled provide the opposite sign of stress, i.e., positive or negative, to the sign of the stress produced on the mounting surfaces on the coupled parallel sides. The load forces are then applied to the frames on their non-coupled parallel sides.

In the preferred embodiment shown in the drawings of this invention the frames are rectangular wherein the coupled parallel sides are equal in length and coupled together at the center of their respective lengths. The load receiving sides, of course, are also equal in length and have means for receiving the load force at the center of their respective lengths. It is to be noted that there are a number of geometrical configurations of frames which may be utilized which will embody the teachings of this invention, e.g., triangles, trapezoids, other polygons, advantageously regular polygons, etc. If mounting surfaces are provided on rectangular frames on non-coupled parallel sides, then the means for receiving a load on said non-coupled parallel sides preferably includes a filleted load receiving member at the load points to make the mounting surface on the non-coupled parallel sides more sensitive to stresses.

Other objects and advantages will become apparent to those skilled in the art from the following description when taken into conjunction with the accompanying drawings, in which:

FIG. I is a view in perspective of a load cell embodying the teachings of this invention;

FIG. II is a plan view of FIG. I;

FIG. III is a front view of FIG II; and

FIG. IV is a side view of FIG III.

Referring to the figures there is shown a load cell comprising a pair of rectangular frames designated generally at 20 and 30. Each of the rectangular frames 20 and 30 has longer parallel sides 21, 22 and 31, 32, respectively. One side 22 of the rectangular frame 20 is coupled in a non-parallel relationship to one side 31 of the rectangular frame 30 by a coupling member 40. It is to be noted that certain configurations within the scope and teachings of this invention need not be coupled in a non-parallel relationship to provide similar mounting surfaces. However, when sides of the frames are coupled in parallel relationship, a coupling member or fillet structure 40, of necessity, must be placed between the sides to provide bending or stressed areas in the coupled sides when load forces are applied to the frames. The non-coupled sides 21 and 32 of the rectangular frames 20 and 30, respectively, are attached to load receiving means 50 and 60 through filleted load receiving coupling members 41 and 42. The load cell shown in the drawings wherein each frame has two parallel sides therefore affords four mounting surfaces 23, 24 and 33, 34 upon which strain gage or deflection sensitive devices 71 through 74 may be mounted.

When compressive load forces are applied to load receiving means 50 and 60 the mounting surfaces 34 and 23 will be under tensile stress while the mounting surfaces 24 and 33 will be under compressive stress.

Advantageously, for use with tensile loads, apertures 51 and 61 are formed in the load receiving means 50 and 60, respectively. As can best be seen in FIG. IV the aperture 51 has been countersunk at 52 and 53. As best seen in FIG. III the aperture 61 has been countersunk at 62 and 63. After countersinking only a small portion of the cylindrical apertures 51 and 61 remains centrally located in the load receiving means 50 and 60, respectively. When a load is connected to the load receiving means the contact with the cylindrical portion of the holes 51 and 61 is operative to center the load forces on an axis formed by a line passing through the centers of the fillets 40, 41 and 42, thereby preventing off-center loading.

In the embodiment shown in the drawings the rectangular frames are interlinked thus enabling the two rectangular frames 20 and 30 to be formed from a single piece of stock which is shorter in length than a piece of stock required for an alternate embodiment which will now be described. Because of the simplicity of design of the load cell the alternate modification, wherein the frames are not interlinked, is deemed not to be complicated enough to require additional drawings. The frames 20 and 30 plus the load receiving means 50 and 60 can just as easily be formed into an integral load cell from a single piece of stock when the planes 20 and 30 are not interlinked. That is, what is now shown as mounting surfaces 33 and 24 would be joined by the filleted coupling member 40. The planes of the sides 31 and 22 opposite the mounting surfaces 33 and 24 of the frames 20 and 30 which are now coupled by the filleted coupling member 40 would then provide mounting surfaces for strain gages or deflective responsive devices. However, this modification wherein the frames are not interlinked would not provide both positive and negative stresses when receiving either a compressive or a tensile load force at the load receiving members 50 and 60. When the load force applied to the load receiving members 50 and 60 is compressive each of the four mounting surfaces in the alternate modification of non-interlinked frames would have tensile stresses thereon. Of course, when tensile forces are applied to the above means 50 and 60 the mounting surfaces on the non-interlinked modification would provide only compressive stress for the strain gages to measure. Therefore, the preferred embodiment of rectangularly interlinked frames is the configuration shown in the drawing.

A second modification of the load cell shown in the drawing would provide mounting surfaces that would have both positive and negative stresses. There is needed but one further step past the first alternate embodiment discussed in the preceding paragraph. That is, the frames 20 and 30 would have their coupled sides 22 and 31 not interlinked. However, the load receiving means 50 and 60 would be sufficiently enlarged so that they could be rotated ninety degrees and interlinked with the frames 20 and 30, respectively. If the load receiving means 50 and 60 were to be interlinked with the frames 20 and 30 they would be preferably shaped as rectangular frames rather than the rectangular blocks with round apertures therethrough as shown in the drawings. If the load receiving means 50 and 60 were interlinked with the rectangular frames 20 and 30, respectively, then the planes of the sides 21 and 32 where the filleted coupling members 41 and 42 are presently located would provide mounting surfaces for strain gages that would be under compression when the load receiving means 50 and 60 were under compression. If, as previously assumed above, the frames 20 and 30 were not interlinked the planes of the sides 22 and 31 which are presently coupled would then be free to provide mounting surfaces which are under tension when a compressive load was applied to the load receiving means 50 and 60. Thus, the second modification would provide positive and negative stresses for use in a measuring circuit.

As can most clearly be seen in FIGS. III and IV, the machining or forming of the load cell of this invention from a single piece of stock is a relatively simple process since all of the fillets formed, whether they are coupling fillet members or fillets formed in the sides of the rectangular frames may be formed by parallel passes of a milling or other suitable machine. Therefore, the cost of the load cell is small.

Thus there is provided a force measuring device or a load cell which comprises a pair of interlinked frames, as shown in the drawings, having their loading and linked points centered on the longer opposite sides and in alignment for each frame. A mounting surface for a strain gage or other deflection responsive device is provided on the longer side of each frame opposite the point of loading to provide compression on the strain gage when the unit is in tension and tension on the gage when the unit is in compression. Such frame also has a gage mounting surface on the interlinked sides opposite the link point to provide tension on the gage when the unit is in tension and compression when it is in compression.

The load cell of this invention may be utilized with bonded strain gages. Since the load cell is constructed from a single piece of stock it has little mechanical hysteresis. The load cell has linear spring characteristics, may be made in a small physical size, has a little response to torque loading, provides mounting surfaces for strain gages having the maximum stress in the unit, provides uniform stress across a mounting surface of adequate area, and provides equal numbers of mounting areas both compressive and tensile stresses.

In conclusion it is pointed out that while the illustrated example constitutes a practical embodiment of my invention, I do not limit myself to the exact details shown, since modification of the same may be made without departing from the spirit of this invention.

Having described the invention, I claim:

1. A force measuring device comprising first and second frames; each of said frames having a side that flexes when the frame is stressed, the remainder of the frame being sufficiently rigid to apply the force necessary to flex said side; rigid mechanical means coupling a first surface of said side of said first frame to a first surface of said side of said second frame, the coupling of said surfaces being limited to a relatively small area of each surface, and said coupled surfaces being disposed in spaced apart parallel planes; mounting surfaces for load responsive devices on a second surface of each of said coupled sides opposite to the area of coupling; and means for applying a load to said frames in a direction substantially perpendicular to said parallel planes of said coupled surfaces and in alignment with the coupled areas of said surfaces, flexing said mounting surfaces.

2. A force measuring device comprising first and second frames; each of said frames having two parallel sides each of which flexes when the frame is stressed, the remainder of the frame being sufficiently rigid to apply the force necessary to flex said sides; rigid mechanical means coupling a first surface of one of said parallel sides of said first frame to a first surface of one of said parallel sides of said second frame, the coupling of said surfaces being limited to a relatively small area of each surface, and said coupled surfaces being disposed in spaced apart parallel planes; mounting surfaces for load responsive devices on a second surface of each of said coupled sides opposite to the area of coupling; mounting surfaces for load responsive devices on a first surface of each of said non-coupled parallel sides; and means for applying a load to said non-coupled parallel sides in a direction substantially perpendicular to said parallel planes of said coupled surfaces and in alignment with the coupled areas of said surfaces, flexing said mounting surfaces.

3. A force measuring device comprising first and second frames; each of said frames having two parallel sides each of which flexes when the frame is stressed, the remainder of the frame being sufficiently rigid to apply the force necessary to flex said sides; rigid mechanical means coupling a first surface of one of said parallel sides of said first frame to a first surface of one of said parallel sides of said second frame, the coupling of said surfaces being limited to a relatively small area of each surface, and said coupled surfaces being disposed in spaced apart parallel planes; mounting surfaces for load responsive devices on a second surface of each of said coupled sides opposite to the area of coupling; mounting surfaces for load responsive devices on a first surface of each of said non-coupled parallel sides; and means for applying a load to said non-coupled parallel sides in a direction substantially perpendicular to said parallel planes of said coupled surfaces and in alignment with the coupled areas of said surfaces, flexing said mounting surfaces; said coupled sides being equal in length and coupled together at the center of their respective lengths.

4. A force measuring device comprising first and second frames; each of said frames having two parallel sides each of which flexes when the frame is stressed, the remainder of the frame being sufficiently rigid to apply the force necessary to flex said sides; rigid mechanical means coupling a first surface of one of said parallel sides of said first frame to a first surface of one of said parallel sides of said second frame, the coupling of said surfaces being limited to a relatively small area of each surface, and said coupled surfaces being disposed in spaced apart parallel planes; mounting surfaces for load responsive devices on a second surface of each of said coupled sides opposite to the area of coupling; mounting surfaces for load responsive devices on a first surface of each of said non-coupled parallel sides; and means for applying a load to said non-coupled parallel sides in a direction substantially perpendicular to said parallel planes of said coupled surfaces and in alignment with the coupled areas of said surfaces, flexing said mounting surfaces; said non-coupled parallel sides being equal in length and having said load applied at the center of their respective lengths.

5. A force measuring device comprising a pair of interlinked frames, each frame having a side that flexes when the frame is stressed, the remainder of the frame being sufficiently rigid to apply the force necessary to flex said side; rigid mechanical means coupling said side of each frame in a spaced relationship; mounting surfaces for strain gage devices on surfaces of said coupled sides opposite the area of coupling; and means for applying a load to said frames at points on said frames opposite the coupling area on each of said frames to flex said mounting surfaces on said coupled sides.

6. A force measuring device comprising a pair of interlinked frames, each frame having two sides that flex when the frame is stressed, the remainder of the frame being sufficiently rigid to apply the force necessary to flex said sides; rigid mechanical means coupling one of said sides of each frame in a spaced relationship; mounting surfaces for strain gage devices on surfaces of said coupled sides opposite the area of coupling; each frame having its second flexible side opposite its coupled side, which second side has a first surface adapted to receive a load and a second surface opposite said first surface to receive strain gage devices; and means for applying a load to said first surfaces of said second sides of said frames to flex the mounting surfaces for the strain gage devices.

References Cited in the file of this patent

UNITED STATES PATENTS

| | | |
|---|---|---|
| 2,421,222 | Schaevitz | May 27, 1947 |
| 2,520,923 | Franzel et al. | Sept. 5, 1950 |
| 2,576,417 | Ruge | Nov. 27, 1951 |
| 2,582,886 | Ruge | Jan. 15, 1952 |
| 2,680,376 | Shaw et al. | June 8, 1954 |
| 2,924,970 | Samsel et al. | Feb. 16, 1960 |